United States Patent
Gourley et al.

(10) Patent No.: US 7,042,847 B2
(45) Date of Patent: May 9, 2006

(54) TELECOMMUNICATIONS TRANSPORT NETWORK COMPRISING ELEMENTS HAVING A PERFORMANCE MONITORING FACILITY AND METHOD OF OPERATING THE SAME

(75) Inventors: David George Robert Gourley, Bath (GB); Wolfgang Krick, Lauf (DE)

(73) Assignee: Lucent Technologies Inc,, Murray Hill, NJ (US)

( * ) Notice: Subject to any disclaimer, the term of this patent is extended or adjusted under 35 U.S.C. 154(b) by 862 days.

(21) Appl. No.: 09/989,886

(22) Filed: Nov. 21, 2001

(65) Prior Publication Data

US 2002/0067698 A1 Jun. 6, 2002

(30) Foreign Application Priority Data

Dec. 4, 2000 (EP) .................................. 00310737

(51) Int. Cl.
*H04L 1/00* (2006.01)
*H04L 12/26* (2006.01)
(52) U.S. Cl. ........................ 370/242; 370/248
(58) Field of Classification Search ................ 370/241, 370/242, 244, 248, 250
See application file for complete search history.

(56) References Cited

U.S. PATENT DOCUMENTS 4,710,924 A * 12/1987 Chum .......................... 714/25

5,555,248 A 9/1996 Sugawara
5,699,348 A * 12/1997 Baidon et al. ............... 370/242

FOREIGN PATENT DOCUMENTS

DE 4437 417 A1 10/1994
EP 0 810 807 A2 12/1997

OTHER PUBLICATIONS

Control and Operation of SDH Network Elements by J. Blume.

* cited by examiner

*Primary Examiner*—Chi Pham
*Assistant Examiner*—Jordan Hamann

(57) ABSTRACT

A telecommunications transport network is described in which a plurality of network elements each has a performance monitoring facility operative to report overall error rate at the element in each network path using the element. The network includes one or more management systems operative to calculate performance of a segment of a path between two network elements, from the reported overall error rates at the elements. Monitoring can thus be provided in management software using standard interfaces to gather the reported error rates, without additional ASICs at the network elements. Since not all paths will require TCM the additional processing required by the network management systems need not be great. Not even every connection that crosses a domain boundary will necessarily need TCM although the facility is especially useful for dedicated connections.

6 Claims, 1 Drawing Sheet

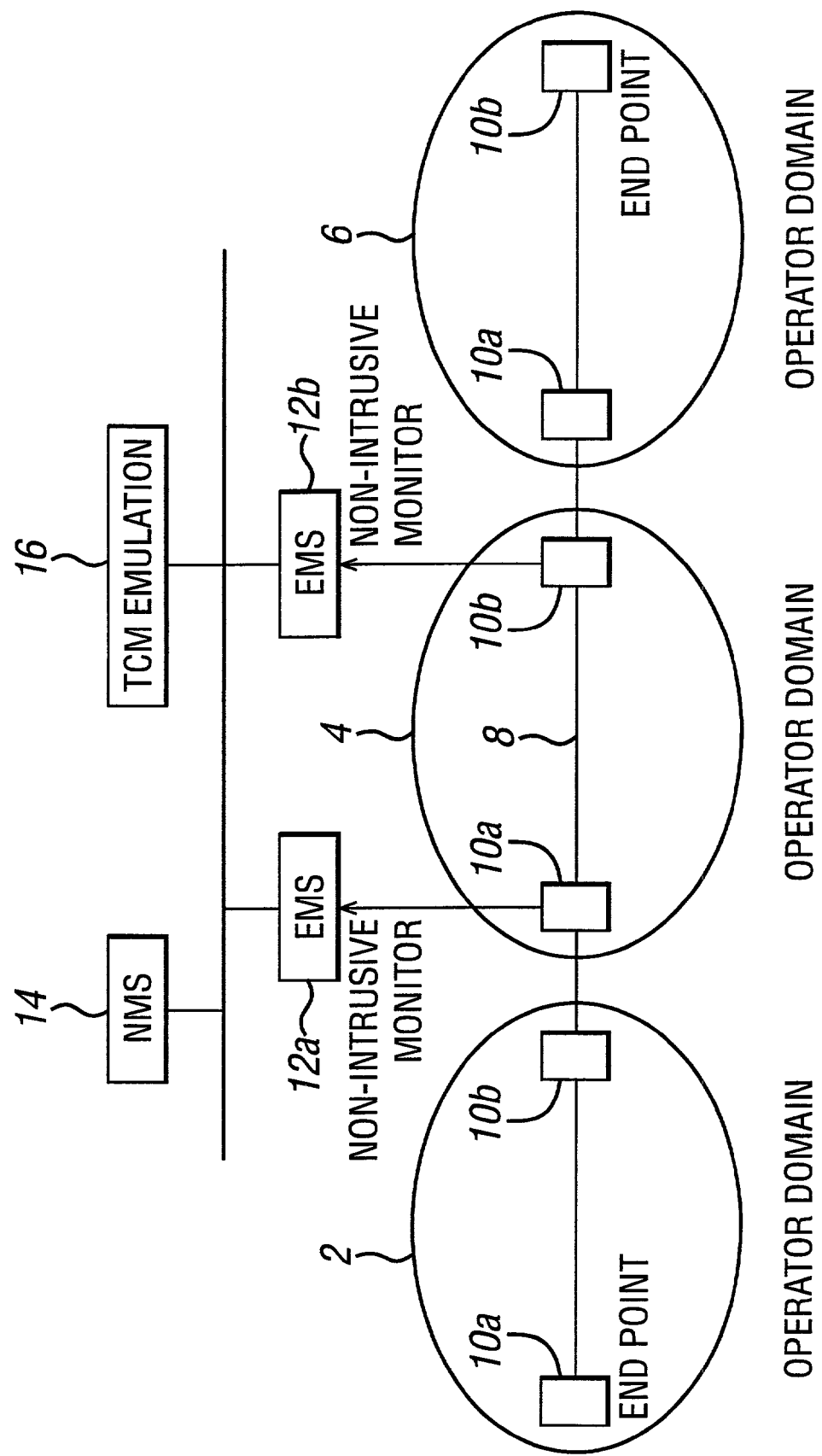

TELECOMMUNICATIONS TRANSPORT NETWORK COMPRISING ELEMENTS HAVING A PERFORMANCE MONITORING FACILITY AND METHOD OF OPERATING THE SAME

CROSS REFERENCE TO RELATED APPLICATION

This application claims priority of European Application No. 00310737.2 filed on Dec. 4, 2000.

FIELD OF THE INVENTION

This invention relates to a telecommunications network and to a method of operating the same.

BACKGROUND

The background to the invention will be explained in relation to a particular application. Other applications may occur to the reader.

In a conventional digital telecommunications network, each network element generally has a facility to report the error rate in the paths which utilise it. The reported error rate is based on the total detected errors from the beginning of the path to the network element. The error rate is reported in the SDH (synchronous digital hierarchy) or SONET (Synchronous Optical NETwork) overhead. This information is useful, for example, in maintaining a quality of service which may be assigned to any particular path. A problem arises when the path crosses the boundary between one operator domain and another. If the error rate reported at the receiving users end is undesirably high, how can the operator responsible be identified?

A solution has been proposed to the problem and is called TCM ("tandem connection monitoring"). As proposed, each network element at a potential domain boundary would have additional facilities to report tandem connection error rate in the SDH or SONET overhead. As a path enters a domain, the error rate would be reset to zero so that as the path leaves the domain the tandem connection error rate would represent the errors occurring only within that domain. Unfortunately, because the facility is required in addition to the "normal" error reporting, and because each network element may form part of many paths (for more complex elements potentially tens of thousands), the cost implications for each network element where TCM support is required, in terms of application specific integrated circuits (ASICs) and software, are so great that few network elements are offered with the facility. In addition, many elements which do provide the facility, can only support the facility for a subset of the paths passing through that element.

SUMMARY

Against this background, there is provided a telecommunications transport network comprising a plurality of network elements each having a performance monitoring facility operative to report overall error rate at the element in each network path using the element, characterised in that the network includes one or more management systems operative to calculate performance of a segment of a path between two network elements, from the reported overall error rates at the elements. Monitoring can thus be provided in management software using standard interfaces to gather the reported error rates, without additional ASICs at the network elements. Since not all paths will require TCM the additional processing required by the network management systems need not be great. Not even every connection that crosses a domain boundary will necessarily need TCM although the facility is especially useful for dedicated connections.

Preferably, a facility is provided to record a maximum error rate, for a given segment of a path for which segment performance is calculated, and including a facility for issuing an alarm if the calculated error rate is closer to the recorded maximum error rate than a predetermined amount.

The invention also extends to a method of operating a telecommunications transport network comprising a plurality of network elements each having a performance monitoring facility, the method comprising reporting overall error rate at the element in a network path using the element, and calculating performance of a segment of a path between two network elements, from the reported overall error rates at the elements.

The method preferably includes recording a maximum error rate, for a given segment of a path for which segment performance is calculated, and issuing an alarm and/or switching the path between the elements, if the calculated error rate is closer to the recorded maximum error rate than a predetermined amount.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 1 is an exemplary telecommunications transport network in accordance with the principles of the present invention.

DETAILED DESCRIPTION

One embodiment of the invention will now be described with reference to the accompanying drawing which is a schematic of a telecommunications transport network embodying the invention.

A telecommunications transport network has a plurality of operator domains 2, 4 and 6. A user requires a path 8 through all three domains. The user specifies a quality of service for the path, something which is especially useful in the case of a dedicated connection. Within the path, the network elements 10a, 10b at the boundaries of each domain are shown. In order that quality of service can be monitored, all network elements, including the elements 10a, 10b include a facility to report the error rate at the element, via the SDH or SONET overhead. The reported error rate is necessarily the rate of total errors since the beginning of the path. The error rate can be monitored to see whether the quality of service requested is being provided and can be reported to the user.

If the quality of service falls below that specified, the existing reported error information does not indicate which domain is not providing the requested quality of service. Of course in each domain, the error rate has to be lower than that requested since the errors are cumulative.

Referring, for example to the domain 4, the segment through the domain, of the path required by the user terminates at the domain boundaries in network elements 10a, 10b. A network management system 14 may collect error rate (performance monitoring information) from underlying EMS (element management systems 12a, 12b using industry standard interfaces (e.g. the Tele Management Forum (TMF) CORBA G7 interface). The TCM function is emulated within the network management system 14 by a software TCM emulation module 16.

The interface specified has been defined by a number of companies within the forum, although this is not essential for the invention: there are other 'standard' interfaces which could be used.

The error rate based on the total errors accumulated in the path on entry into the domain 4 from the domain 2, is calculated by a standard facility in the network element 10a. This error rate is reported via the SDH or SONET overhead and the interface 12a to the network management system 14. Inside the domain 4 there is the possibility of more errors being accumulated. The network element 10b also has a standard facility which calculates the error rate at this point in the path, based on the total errors accumulated. This error rate is also reported via SDH or SONET overhead and the interface 12b to the network management system 14.

The TCM emulation module 16 of the network management system 14 uses the reported error rates to calculate the error rate attributable to the segment 4. To this end, the total error rate reported by the network element 10a is subtracted from the total error rate reported by the network element 10b to give the error rate attributable to the domain 4.

The SDH or SONET overhead contains a specification of the quality of service, and thus error rate, required by the user. This is also reported to the TCM emulation module via the interfaces 12a and/or 12b. If the error rate attributable to the domain 4 approaches the required error rate closer than a settable amount the TCM emulation module issues an alarm. The alarm can be communicated to the user and can be used by the operator to send service personnel to investigate the problem and/or to assign the connection to a second (redundant) path through the domain. With state of the art network elements and interfaces, the error rates will be reported to the TCM emulation module approximately every 15 minutes. Although that is less frequent than would happen with dedicated TCM, it is thought to be sufficient.

The invention claimed is:

1. A telecommunications transport network comprising: a plurality of network elements each having a performance monitoring facility operative report overall error rate at the element in each network path using the element, and one or more management systems operative to calculate performance of a segment of a path between two network elements, from the reported overall error rates at the elements, wherein said one or more management systems are operative to subtract a total error rate reported by a first network element from a total error rate reported by a second network element to thereby provide an error rate attributable to particular network domain.

2. A network as claimed in claim 1, in which a facility is provided to record a maximum error rate, for a given segment of a path for which segment performance is calculated, and including a facility for issuing an alarm if the calculated error rate is closer to the recorded maximum error rate than a predetermined amount.

3. A method of operating a telecommunications transport network comprising a plurality of network elements each having a performance monitoring facility, the method comprising:

reporting overall error rate at the element in a network path using the element, and calculating performance of a segment of a path between two network elements, from the reported overall error rates at the elements wherein said step of calculating includes the step of subtracting a total error rate reported by a first network element from a total error rate reported by a second network element to thereby provide an error rate attributable to particular network domain.

4. A method as claimed in claim 3, including recording a maximum error rate, for a given segment of a path for which segment performance is calculated, and issuing an alarm and/or switching the path between the elements, if the calculated error rate is closer to the recorded maximum error rate than a predetermined amount.

5. An apparatus for providing performance monitoring of a telecommunications transport network comprising:

a performance monitoring facility coupled to designated network elements, said performance monitoring facility operative to report overall error rate at the element in each network path using the element, and one or more management systems operative to calculate performance of a segment of a path between two network elements, from the reported overall error rates at the elements;

wherein said one or more management systems are operative to subtract a total error rate reported by first network element from a total error rate reported by second network element to thereby provide an error rate attributable to particular network domain, wherein said management systems include an element management system which couples to a network management system.

6. The apparatus of claim 5, further including a TCM emulation device coupled to said one or more management systems.

* * * * *